United States Patent
Telukunta et al.

(10) Patent No.: US 11,718,239 B2
(45) Date of Patent: Aug. 8, 2023

(54) VEHICLE ROOF RACK ASSEMBLY

(71) Applicant: FORD GLOBAL TECHNOLOGIES, LLC, Dearborn, MI (US)

(72) Inventors: Rohit Telukunta, Novi, MI (US);
Adam Weyrauch, Canton, MI (US);
Peter Joyce, Royal Oak, MI (US);
Steven Frank, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/500,443

(22) Filed: Oct. 13, 2021

(65) Prior Publication Data

US 2023/0112227 A1 Apr. 13, 2023

(51) Int. Cl.
*B60R 9/045* (2006.01)

(52) U.S. Cl.
CPC ................... *B60R 9/045* (2013.01)

(58) Field of Classification Search
CPC ....................................... B60R 9/045
USPC ...................................... 224/314
See application file for complete search history.

(56) References Cited

U.S. PATENT DOCUMENTS

| | | | |
|---|---|---|---|
| 5,340,007 A | 8/1994 | Jeuffray et al. | |
| 5,377,890 A | 1/1995 | Brunner et al. | |
| 6,811,066 B2* | 11/2004 | Aftanas | B60R 9/045 224/325 |
| 6,959,845 B2* | 11/2005 | Aftanas | B60R 9/045 224/325 |
| 7,066,364 B2* | 6/2006 | Kmita | B60R 9/045 224/325 |
| 7,090,103 B2* | 8/2006 | Aftanas | B62H 3/02 224/325 |
| 8,028,875 B2* | 10/2011 | Kmita | B60R 9/045 224/325 |
| 8,251,267 B2* | 8/2012 | Aftanas | B60R 9/045 224/325 |
| 8,276,794 B2* | 10/2012 | Aftanas | B60R 9/045 224/322 |
| 8,485,403 B2* | 7/2013 | Stahl | B60R 9/045 224/325 |
| 8,528,799 B2* | 9/2013 | Michie | B60R 9/048 224/321 |
| 8,640,934 B2* | 2/2014 | Jamieson | B60R 9/058 224/325 |
| 9,616,819 B2* | 4/2017 | Kmita | B60R 9/052 |
| 10,279,748 B2* | 5/2019 | Aftanas | B60R 9/04 |
| 10,576,901 B2* | 3/2020 | Aftanas | B60R 9/052 |
| 10,850,675 B2* | 12/2020 | Mansour | B60R 9/045 |
| 11,007,948 B2* | 5/2021 | Sala | B60R 9/045 |
| 11,027,660 B2* | 6/2021 | Gomes | B60R 9/045 |

(Continued)

FOREIGN PATENT DOCUMENTS

CN 102529829 A 7/2012

*Primary Examiner* — Peter N Helvey
(74) *Attorney, Agent, or Firm* — Vichit Chea; Carlson, Gaskey & Olds, P.C.

(57) ABSTRACT

A roof rack assembly for a vehicle includes a pedestal including an indentation. A roof rail is movable between a first configuration and a second configuration relative to the pedestal. In the first configuration, a toggle loop of the roof rail is positioned in a first orientation relative to the indentation. In the second configuration, the toggle loop is positioned in a second orientation relative to the indentation.

20 Claims, 7 Drawing Sheets

(56) References Cited

U.S. PATENT DOCUMENTS

| | | | | |
|---|---|---|---|---|
| 2006/0163297 A1* | 7/2006 | Moreau | ............... | B60R 9/045 |
| | | | | 224/325 |
| 2008/0252100 A1* | 10/2008 | Salvador | ............. | B60R 9/045 |
| | | | | 296/185.1 |
| 2008/0257924 A1* | 10/2008 | Kmita | .................. | B60R 9/045 |
| | | | | 224/309 |
| 2009/0321485 A1* | 12/2009 | Jamieson | ............. | B60R 9/04 |
| | | | | 224/309 |
| 2010/0264179 A1* | 10/2010 | Johnson | ............. | B60R 9/045 |
| | | | | 224/325 |
| 2015/0217698 A1* | 8/2015 | Evans | ................. | B60R 9/10 |
| | | | | 224/322 |
| 2017/0320445 A1* | 11/2017 | Aftanas | .............. | B60R 9/045 |

* cited by examiner

VEHICLE ROOF RACK ASSEMBLY

TECHNICAL FIELD

This disclosure relates to vehicle roof rails that are reorientable and modular.

BACKGROUND

Vehicle roofs may include roof rails that can be used as mounting points for securing cargo. Standard roof rails typically extend longitudinally on a vehicle. However, cross-car roof rails are typically required to mount bulkier or longer items to the vehicles. In some cases, customers must purchase add-on, secondary cross-car rails that mount on top of the standard longitudinal rails.

SUMMARY

A roof rack assembly for a vehicle according to an exemplary aspect of the present disclosure includes a pedestal including an indentation. A roof rail is movable between a first configuration and a second configuration relative to the pedestal. In the first configuration, a toggle loop of the roof rail is positioned in a first orientation relative to the indentation. In the second configuration, the toggle loop is positioned in a second orientation relative to the indentation.

In another example of the foregoing assembly, the toggle loop includes a flat front loop portion, and further the pedestal includes a first face configured to receive the flat front loop portion in the first configuration and a second face that is substantially orthogonal to the first face and configured to receive the flat front loop portion in the second configuration.

In another example of any of the foregoing assemblies, the indentation spans from the first face to the second face and is configured to receive the flat front loop portion.

In another example of any of the foregoing assemblies, the roof rail includes a lever actuatable to fasten the toggle loop to the pedestal.

In another example of any of the foregoing assemblies, the toggle loop includes loop ends engaging the lever and a front loop portion configured to be received in the indentation in both the first and second configuration.

In another example of any of the foregoing assemblies, actuation of the lever translates the loop ends away from the pedestal such that the front loop portion is fastened within the indentation.

In another example of any of the foregoing assemblies, the roof rail includes a base and at least one rotatable member mounted on the base, the rotatable member rotatable from a stowed position in which it is substantially parallel to the base to a vertically extending position.

In another example of any of the foregoing assemblies, the at least one rotatable member includes a first rotatable member and a second rotatable member each rotatable about respective pivot points located towards opposed longitudinal ends of the base.

In another example of any of the foregoing assemblies, the pivot points include a stop at the vertically extending position, and the rotatable members each form an obtuse angle with the base at said vertically extending position.

In another example of any of the foregoing assemblies, the roof rail includes a divider mounted to the base between the first and second rotatable members, and wherein the members and divider form a substantially continuous top surface of the roof rail when the members are in the stowed position.

In another example of any of the foregoing assemblies, the divider and the rotatable members are removable from the roof rail.

In another example of any of the foregoing assemblies, the roof rail includes a retractable tie-down cordage mechanism.

A roof rack assembly for a vehicle according to an exemplary aspect of the present disclosure includes at least one endcap including a pedestal. At least one roof rail is movable between a longitudinal configuration and a cross-car configuration. A toggle loop of the at least one roof rail is configured to engage the pedestal in both the longitudinal and the cross-car configuration.

In another example of any of the foregoing assemblies, the at least one roof rail is removable from the at least one endcap.

In another example of any of the foregoing assemblies, the at least one roof rail is extendable between a first length in the cross-car configuration and a second, different length in the longitudinal configuration.

In another example of any of the foregoing assemblies, the at least one roof rail includes a first roof rail and a second roof rail, and the first and second roof rails each include two toggle loops.

In another example of any of the foregoing assemblies, the at least one endcap includes a first endcap and a second endcap located towards a front of the vehicle and a third endcap and a fourth endcap located towards a rear of the vehicle, the first and third endcaps located towards a first lateral side of the vehicle and the second and fourth endcaps located towards a second, opposed lateral side of the vehicle.

In another example of any of the foregoing assemblies, in the longitudinal configuration, the toggle loops of the first roof rail engage with the pedestals of the first and third endcaps, and the toggle loops of the second roof rail engage with the pedestals of the second and fourth endcaps.

In another example of any of the foregoing assemblies, in the cross-car configuration, the toggle loops of the first roof rail engage with the pedestals of the first and second endcaps, and the toggle loops of the second roof rail engage with the pedestals of the third and fourth endcaps.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a vehicle roof rack assembly with roof rails that are reorientable and may include modular components. An exemplary roof rack assembly may include endcaps and movable rails with connection features configured to engage with the endcaps. The movable rails may include a base mounting connectable components. These and other features of this disclosure are described in greater detail in the following paragraphs of this detailed description.

Figure 1:
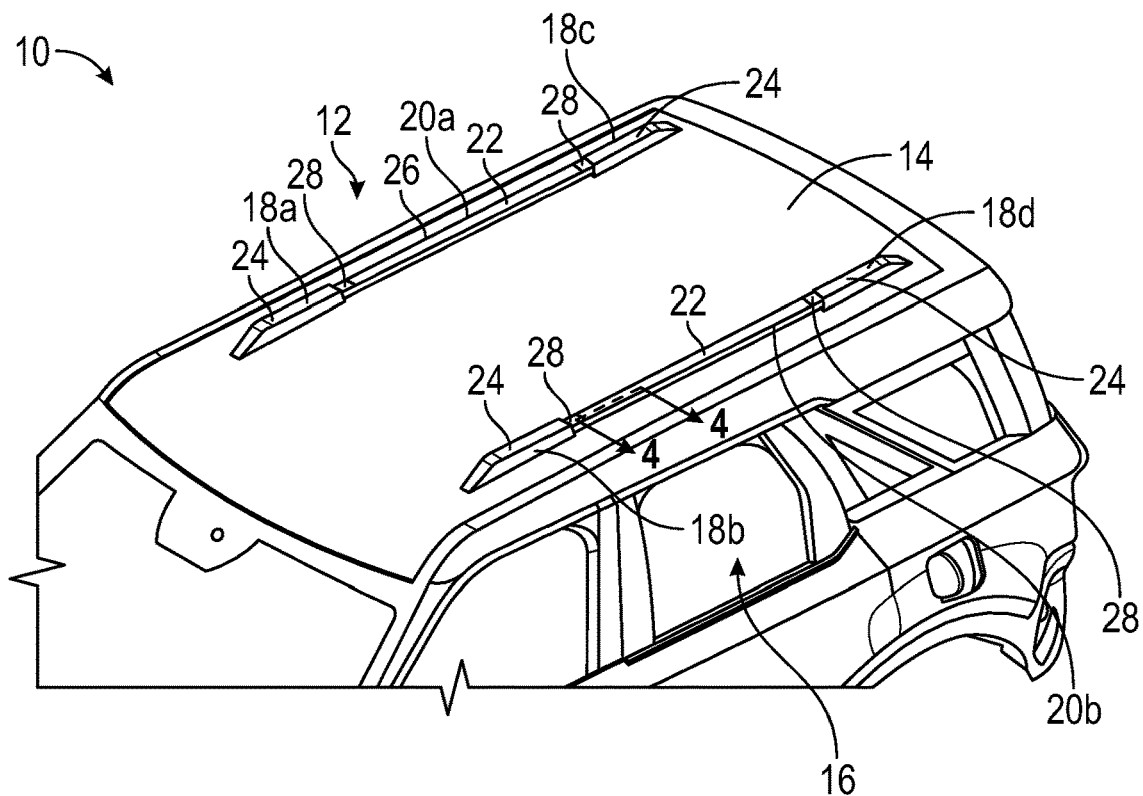
FIG. 1 illustrates a motor vehicle with a roof rack assembly configured in a longitudinal configuration.

FIG. 1 illustrates a motor vehicle 10 including a roof rack assembly 12 configured in a longitudinal configuration. In an embodiment, the vehicle 10 is a sport utility vehicle (SUV). However, the vehicle 10 could alternatively be configured as a car, a truck, a van, or any other type of vehicle within the scope of this disclosure. The vehicle 10 could also be a conventional motor vehicle, a battery powered hybrid or electric vehicle, or an autonomous vehicle (i.e., a driverless vehicle).

The vehicle 10 includes a roof 14 that establishes an upper barrier surface for enclosing a passenger cabin 16 of the vehicle 10. The roof rack assembly 12 is mounted to the roof 14 and may provide a mounting point for securing cargo on the vehicle.

The roof rack assembly 12 may include a first endcap 18a, a second endcap 18b, a third endcap 18c, and a fourth endcap 18d mounted to the roof 14. The endcaps 18a and 18b are located towards the front of the vehicle 10, and the endcaps 18c and 18d are located towards a rear of the vehicle 10. The endcaps 18a and 18c may be located towards a first lateral side of the vehicle, in this example the right, or passenger side of the vehicle 10. The endcaps 18b and 18d may be located towards a second lateral side of the vehicle that is opposed to the first side, in this example the left, or driver side of the vehicle 10.

The roof rack assembly 12 may further include a first roof rail 20a and a second roof rail 20b. In the longitudinal configuration illustrated in FIG. 1, the roof rails 20a/20b extend longitudinally with respect to the vehicle and therefore extend in parallel with the length of the vehicle 10. In this configuration, the first roof rail 20a extends between and engages with endcaps 18a and 18c such that it is located towards the first lateral side, and the second roof rail 20b extends between and engages with the endcaps 18b and 18c such that it is located towards the second lateral side.

The roof rails 20a/20b may include a square prism shape, i.e. they include a square cross-section, and each may include a flat top surface 22. However, other roof rail shapes are further contemplated within the scope of this disclosure.

The endcaps 18a/18b/18c/18d may represent any sort of mounting interface or structure. The endcaps 18a/18b/18c/18d may also include flat top portions 24 that mount longitudinally with respect to the vehicle 10. In the longitudinal configuration, the top surface 22 of the roof rails 20a/20b and the flat top portion 24 of the endcaps 18a/18b/18c/18d form a substantially continuous top surface 26 of the roof rack assembly 12.

Figure 2:
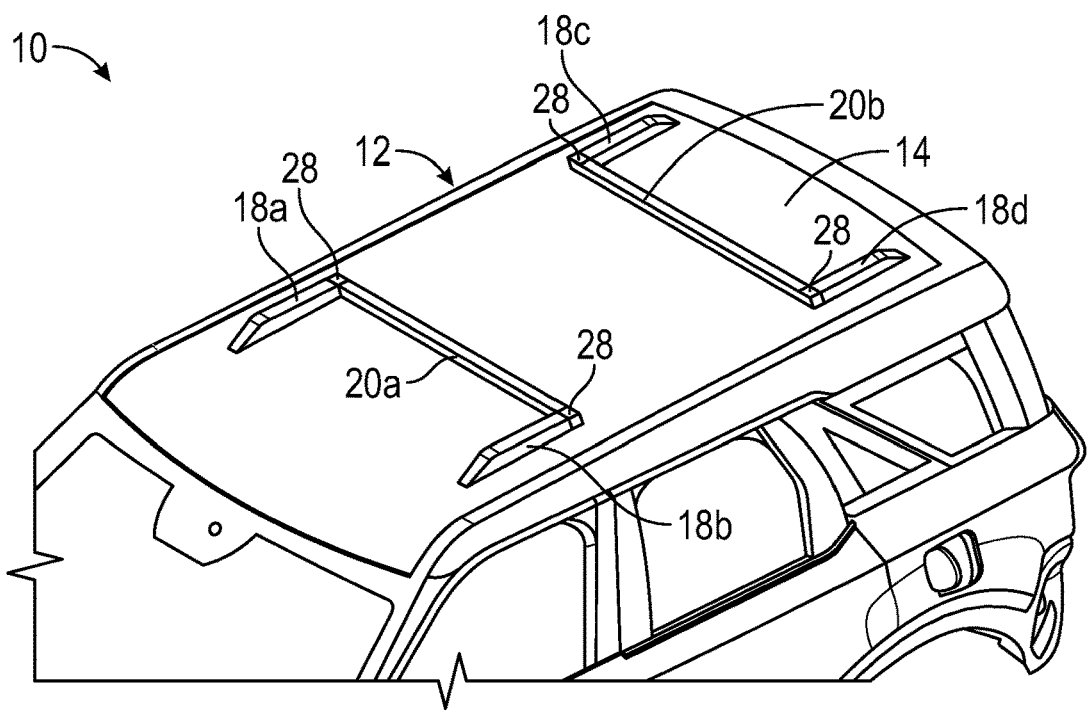
FIG. 2 illustrates a cross-car configuration of the roof rack assembly of FIG. 1.

FIG. 2 illustrates the roof rack assembly 12 configured in a cross-car configuration. In the cross-car configuration, the roof rails 20a/20b mount transversely across the vehicle roof 14. In this configuration, the first roof rail 20a may mount between and engage with the endcaps 18a and 18b such that it is located towards a front of the vehicle 10, and the second roof rail 20b may mount between and engage with the endcaps 18c and 18d such that it is located towards a rear of the vehicle 10.

The roof rails 20a/20b are movable between the longitudinal configuration illustrated in FIG. 1 and the cross-car configuration illustrated in FIG. 2. In this regard, the roof rails 20a/20b may include a quick-release mechanism 28 near each of their longitudinal ends. The quick release mechanisms 28 allow a user to easily disengage the roof rails 20a/20b from the endcaps 18a/18b/18c/18d, reorient the roof rails 20a/20b from the longitudinal to the cross-car configuration, or vise versa, and then reengage the roof rails 20a/20b with the endcaps.

The longitudinal configuration may be aesthetically preferable to the user and may result in less drag during vehicle travel. However, the cross-car configuration may better enable a user to mount bulkier or longer items to the vehicle 10, such as luggage, lumber, camping equipment, bikes, kayaks, etc. The roof rack assembly 12 allows a user to utilize the advantages of both configurations for a given situation without requiring additional components.

Figure 3:
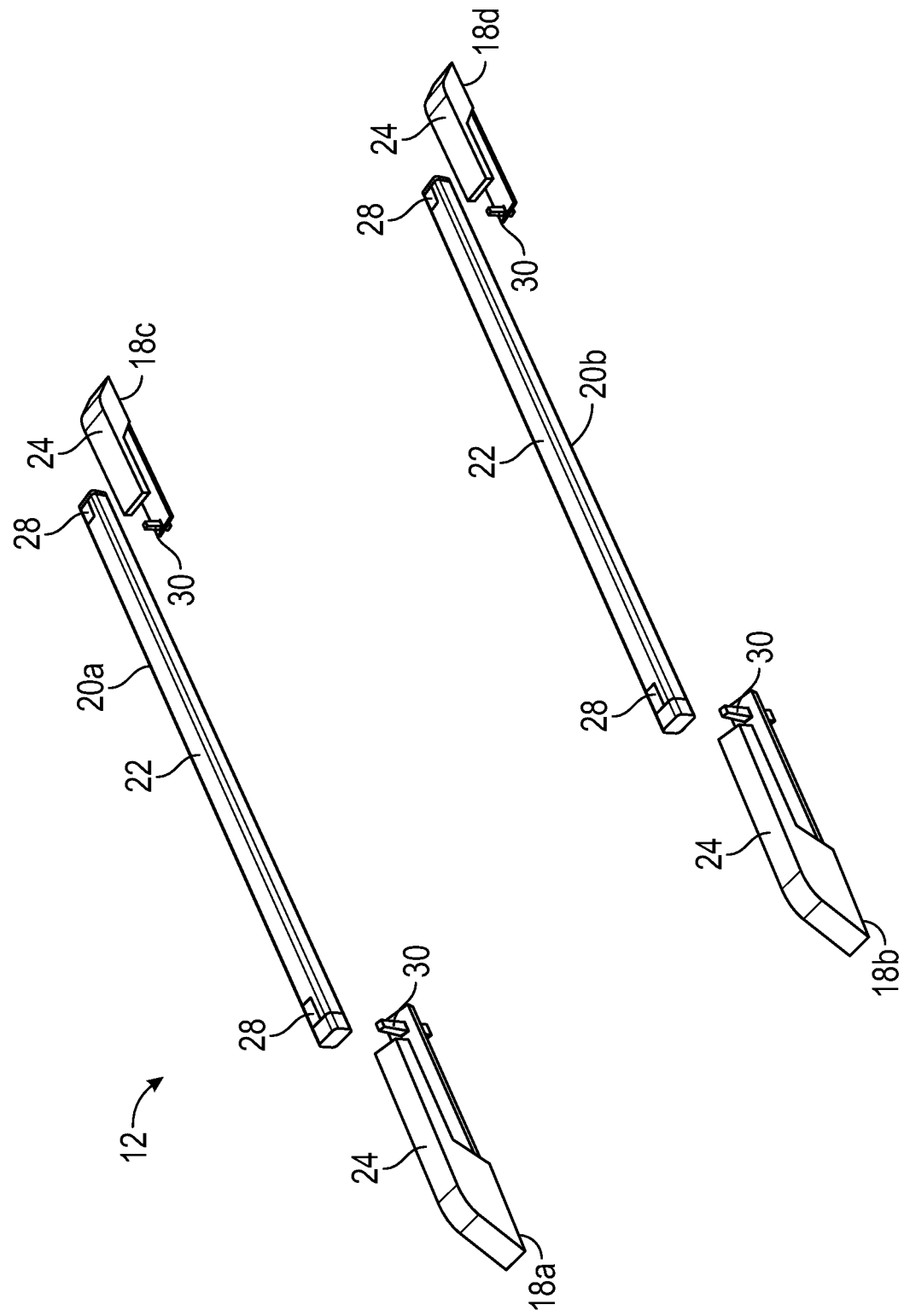
FIG. 3 illustrates an exemplary roof rack assembly.

FIG. 3 illustrates the roof rack assembly 12 separately from the vehicle 10 and with the roof rails 20a/20b disengaged from the endcaps 18a/18b/18c/18d. The endcaps 18a/18b/18c/18d may each include a pedestal 30. The pedestal 30 is a vertically extending member or pin which is configured to interface with the quick release mechanisms 28 of the roof rails 20a/20b in both the longitudinal configuration and the cross car-configuration. In this example, the distance between the pedestals 30 of the endcaps 18a and 18b may be equal to the distances between the pedestals 30 of the endcaps 18a and 18c, the endcaps 18b and 18d, and the endcaps 18c and 18d. In other words, the pedestals 30 may be located at the corners of a square.

Figure 4:
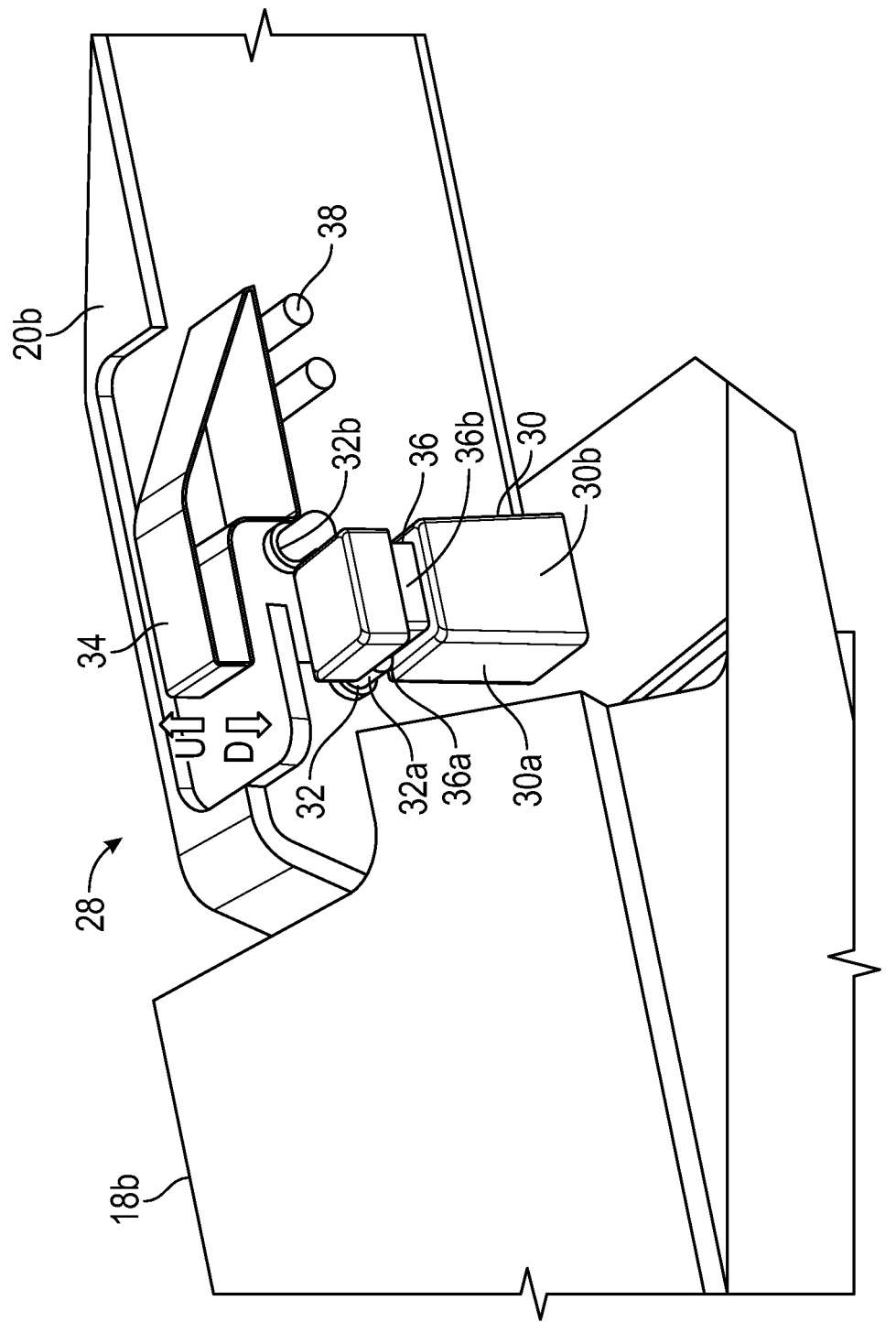
FIG. 4 illustrates an isometric cross-section taken through section 4-4 in FIG. 1.

FIG. 4 illustrates an isometric cross-section of the quick release mechanism 28 of one of the roof rails 20a/20b and the pedestal 30 of one of the endcaps 18a/18b/18c/18d. The quick release mechanism 28 may include a toggle loop 32 and a lever 34. The toggle loop 32 may include a flat front loop portion 32a and loop ends 32b that are connected to the lever 34.

The pedestal 30 may include a first face 30a and a second face 30b that is substantially orthogonal to the first face 30a. In an example, the first face 30a faces toward the endcap 18b and the second face 30b faces in a direction towards a lateral side of the vehicle 10. The pedestal 30 may further include an indentation 36 spanning from the first face 30a to the second face 30b.

Figure 5:
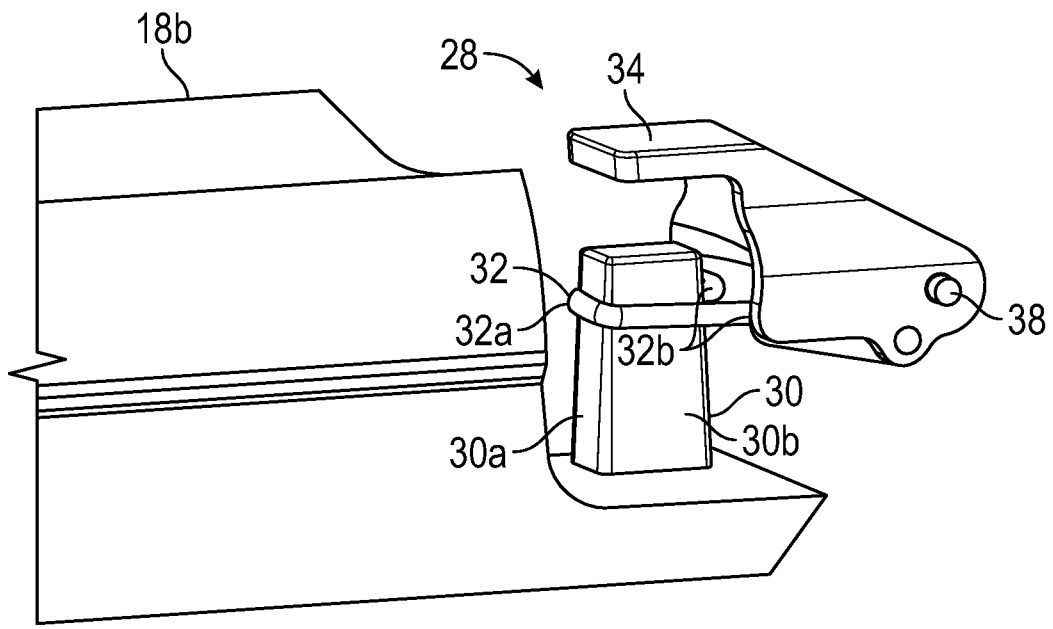
FIG. 5 illustrates a quick-release mechanism engaging a pedestal of a roof rack assembly in the longitudinal configuration.
Figure 6:
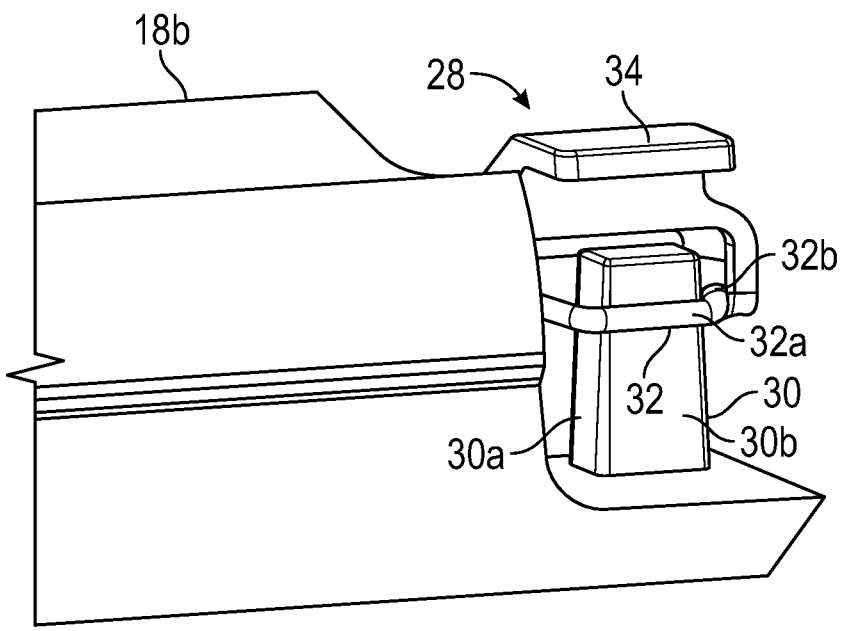
FIG. 6 illustrates the quick-release mechanism engaging the pedestal in the cross-car configuration.

FIG. 5 illustrates the quick release mechanism 28 engaging the pedestal 30 in the longitudinal configuration of the roof rail 20b, and FIG. 6 illustrates the quick release mechanism 28 engaging the pedestal 30 in the cross-car configuration of the roof rail 20b. As can be appreciated, the indentation 36 of the pedestal 30 is configured to receive the flat front loop portion 32a of the toggle loop 32 in both orientations. Specifically, the flat front loop portion 32a may engage a first portion 36a of the indentation 36 that is disposed on the first face 30a of the pedestal 30 in the longitudinal configuration and may engage a second portion 36b of the indentation 36 that is disposed on the second face 30b of the pedestal 30 in the cross-car configuration.

Referring now to FIGS. 4-6, the lever 34 is actuatable to fasten the toggle loop 32 to the pedestal 30. The loop ends 32b may be rotatably mounted to the lever 34, and the lever 34 is rotatable about a pivot point 38. When the lever 34 is pivoted down in a direction D, loop ends 32b are translated away from the pedestal 30 such that the flat front loop portion 32a is forced against and received within the indentation 36. When the lever 34 is pivoted up in a direction U, or released, the loop ends 32b are translated towards the pedestal 30 such that the flat front loop portion 32a is removable from the indentation 36. In both the longitudinal configuration and the cross-car configuration, the roof rails 20a/20b may include toggle loops 32 that engaged pedestals 30 on both of their longitudinal ends to secure the roof rails 20a/20b in place.

Although in the illustrated example the quick release mechanisms 28 are located at the ends of roof rails 20a/20b and pedestals 30 are located on the endcaps 18a/18b/18c/18d, in other example the roof rails 20a/20b may include pedestals 30 at their longitudinal ends which are configured to engage with quick release mechanisms 28 that are located on the endcaps 18a/18b/18c/18d.

The quick release mechanism 28 allows for easy adjustment between configurations without the need for any additional tools or hardware. The indentation 36 aligns the toggle loop 32 vertically on the pedestal 30 and facilitates a secure attachment of the roof rails 20a/20b to the pedestals 30. The inclusion of a flat front portion 32a on the toggle loop 32 that is adapted to engage first and second substantially orthogonal faces 30a/30b of the pedestal 30 increases the surface area of the connection and also aids in constraining and affixing the roof rails 20a/20b in place.

Figure 7:
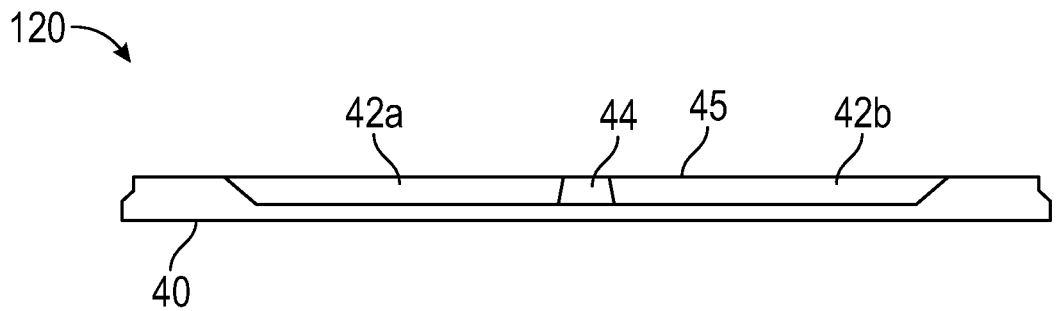
FIG. 7 illustrates an exemplary roof rail of a roof rack assembly.
Figure 8:
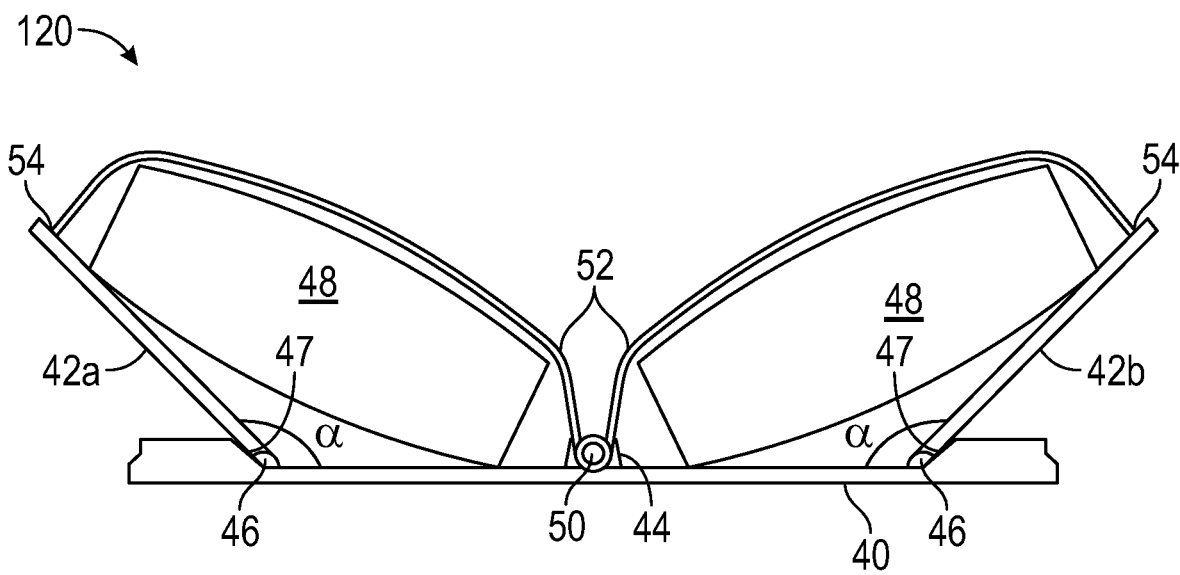
FIG. 8 illustrates the roof rail of FIG. 7 with the rotatable members in a vertically extending position.
Figure 9:
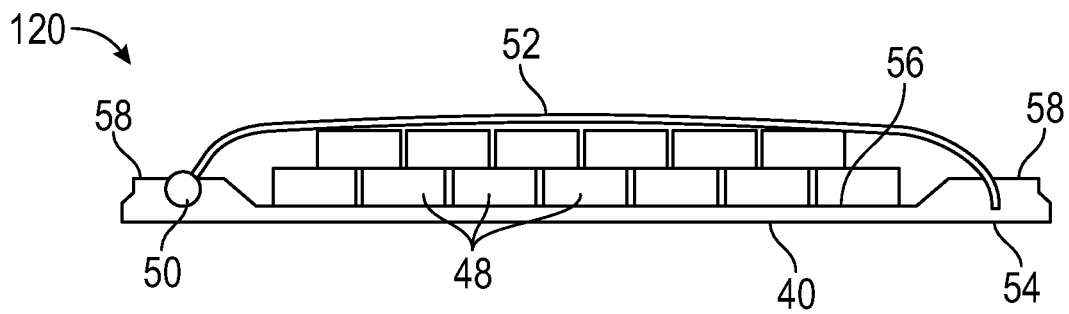
FIG. 9 illustrates the roof rail of FIG. 7 with the rotatable members and divider removed.

FIGS. 7-9 schematically illustrate another example roof rail 120 that could be utilized as part of the roof rack assembly 12, for example. In this disclosure, like reference numerals designate like elements where appropriate and reference numerals with the addition of one-hundred or multiples thereof designate modified elements that are understood to incorporate the same features and benefits of the corresponding elements.

The roof rail 120 may include a base 40 configured to mount one or more quick-connect components. The base 40 and the quick-connect components are configured such that a user can easily add or remove components to the base 40. In one example, the base 40 may include an inverted T-shaped slot configured to receive quick-connect components with T-shape flanges. In this example, the T-shaped flange of a quick-connect component may slide into, or be removed from, the inverted T-shaped slot of the base 40 at an opening at a longitudinal end of the base 40. The quick-connect components may then be slid to a desired location on the base 40 and fastened. In another example, the base 40 may include a plurality of longitudinally spaced receptors configured to receive quick-connect components with a turn-pin, or bayonet mount attachment feature. In this example, a quick connect component may be inserted within a receptor of the base 40 at a desired location and then rotated such that the turn-pin attachment feature locks the component in place. In another example, the quick-connect components may be attached to the base 40 via a snap-fit buckle mechanism. The above examples should be construed to be non-limiting, and the base 40 and quick-connect components may be configured in any manner that allows a user to easily add and remove components from the base 40.

In the example of FIG. 7, a first rotatable member 42a, a second rotatable member 42b, and a divider 44 are quick-connect components that may be mounted to the base 40. FIG. 7 illustrates the first and second rotatable members 42a/42b in a stowed position wherein they are substantially parallel to the base 40. The divider 44 may be mounted to the base 40 between the first and second rotatable members 42a/42b. In the stowed position, the divider 44 and the rotatable members 42a/42b form a substantially continuous top surface 45 of the roof rail 120.

FIG. 8 illustrates the roof rail 120 when the first and second rotatable members 42a/42b are rotated about pivot points 46 from the stowed position to a vertically extending position. The pivot points 46 may each include a stop 47 which may be a slanted surface of the base 40 configured to constrain additional rotation of the rotatable members 42a/42b past the vertically extending position. At the vertically extending position, the rotatable members 42a/42b may each form an obtuse angle α relative to the base 40.

When the rotatable members 42a/42b are rotated out to the vertically extending positions, the rotatable members 42a/42b and bases 40 may form a V-shaped support. When two roof rails 120 are oriented in a cross-car configuration with their rotatable members 42a/42b in the vertically extending positions, the roof rails 120 can support cargo 48 (e.g., kayaks or other relatively long cargo) schematically illustrated in FIG. 8 extending longitudinally between the rails 120 and laterally constrained between the rotatable members 42a/42b. The angle α of the rotatable members 42a/42b in the vertically extending positions allows the cargo 48 to be mounted at an angle to better fit on the roof 14.

FIG. 8 further illustrates that the rotatable members 42a/42b and/or the divider 44 may include a retractable tie-down cordage mechanism 50. The retractable tie-down cordage mechanism 50 includes a retractable spool of cordage 52 that a user may unravel to secure the cargo 48 to the roof rail 120. The cordage 52 may be rope, cable, bungee cord, or any other appropriate tie-down material. In the example of FIG. 8, the cordage 52 extends out of the divider 44 to anchor points 54 located at the ends of the rotatable members 42a/42b. Alternatively, the cordage 52 could extend from the ends of the rotatable member 42a/42b to anchor points located on the divider 44.

FIG. 9 illustrates the base 40 of the roof rail 120 without the quick connect components, e.g. with the rotatable members 42a/42b and the divider 44 removed. Removal of these components may advantageously decrease the overall weight of the roof rail 120. Further, removal of the quick connect components may provide access to a valley portion 56 of the base 40 extending between ridge portions 58 at the longitudinal ends of the base 40. The valley portion 56 may provide an ideal surface for stacking cargo 48 (e.g., lumber or other cargo) extending between two roof rails 120 in the cross-car configuration. The ridge portions 58 serve to laterally constrain cargo 48 within the valley portion 56.

FIG. 9 further illustrates that the retractable tie-down cordage mechanism 50 described above may also be located in one of the ridge portions 58 of the base 40. In this example, cordage 52 extends from one of the ridge portions 58 to an anchor point 54 on the other ridge portion to secure cargo 48 within the valley portion 56.

Figure 10:
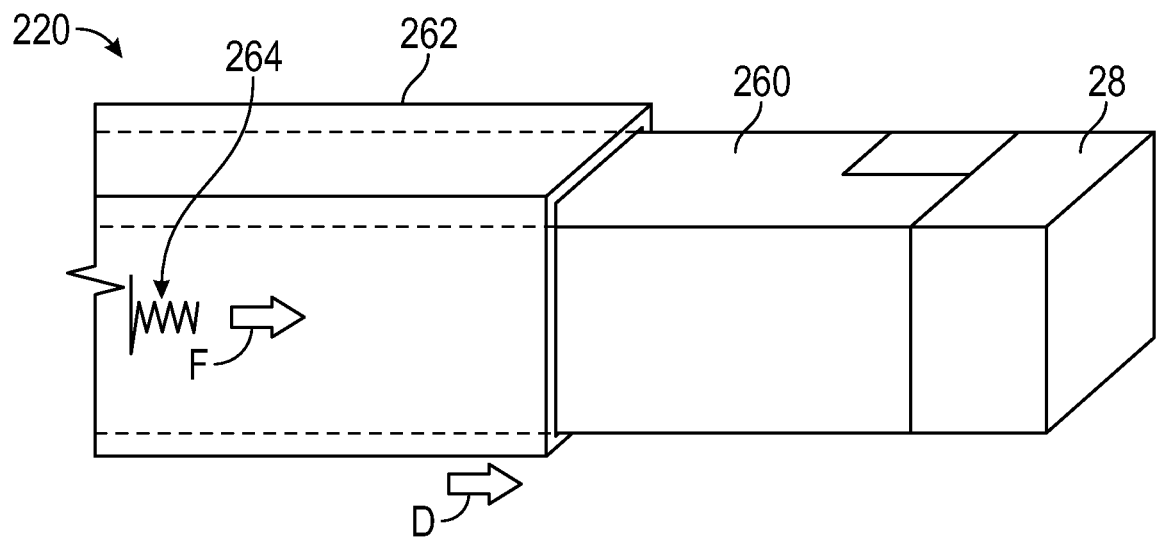
FIG. 10 illustrates another exemplary roof rail of a roof rack assembly.

FIG. 10 illustrates another example roof rail 220 that could be utilized as part of the roof rack assembly 12, for example. Roof rail 220 includes a telescoping function with an inner rail portion 260 and an outer rail portion 262. Both the inner rail portion 260 and the outer rail portion 262 include a quick release mechanism 28 at the longitudinal ends of roof rail 220. Inner rail portion 260 is slidably housed within outer rail portion 262, and may be extended in a direction D to increase the overall length of roof rail 220. A spring 264 may be included within the outer rail portion 262 to bias the inner rail portion 260 in the direction D with a spring force F.

Roof rail 220 allows for non-equidistant positioning of the pedestals 30 of endcaps 18a/18b/18c/18d. Accordingly, in one example, a cross-car distance between the pedestals 30 of front endcaps 18a and 18b and rear endcaps 18c and 18d may be less than a longitudinal distance between the pedestals 30 of right-side endcaps 18a and 18c and left-side endcaps 18b and 18d. In this example, when the roof rail 220 is oriented in the cross-car configuration, the inner rail portion 260 is more retracted within the outer rail portion 262 to decrease the overall length of the roof rail 220, and engagement of the quick release mechanisms 28 with the pedestals 30 keeps the spring 264 compressed. When the roof rail 22 is oriented in the longitudinal position, the spring 264 biases the inner rail portion 260 to extend further out from the outer rail portion 262 to increase the overall length of the roof rail 220 to span the longitudinal distance. Alternatively, the cross-car distance may be longer than the longitudinal distance.

Figure 11:
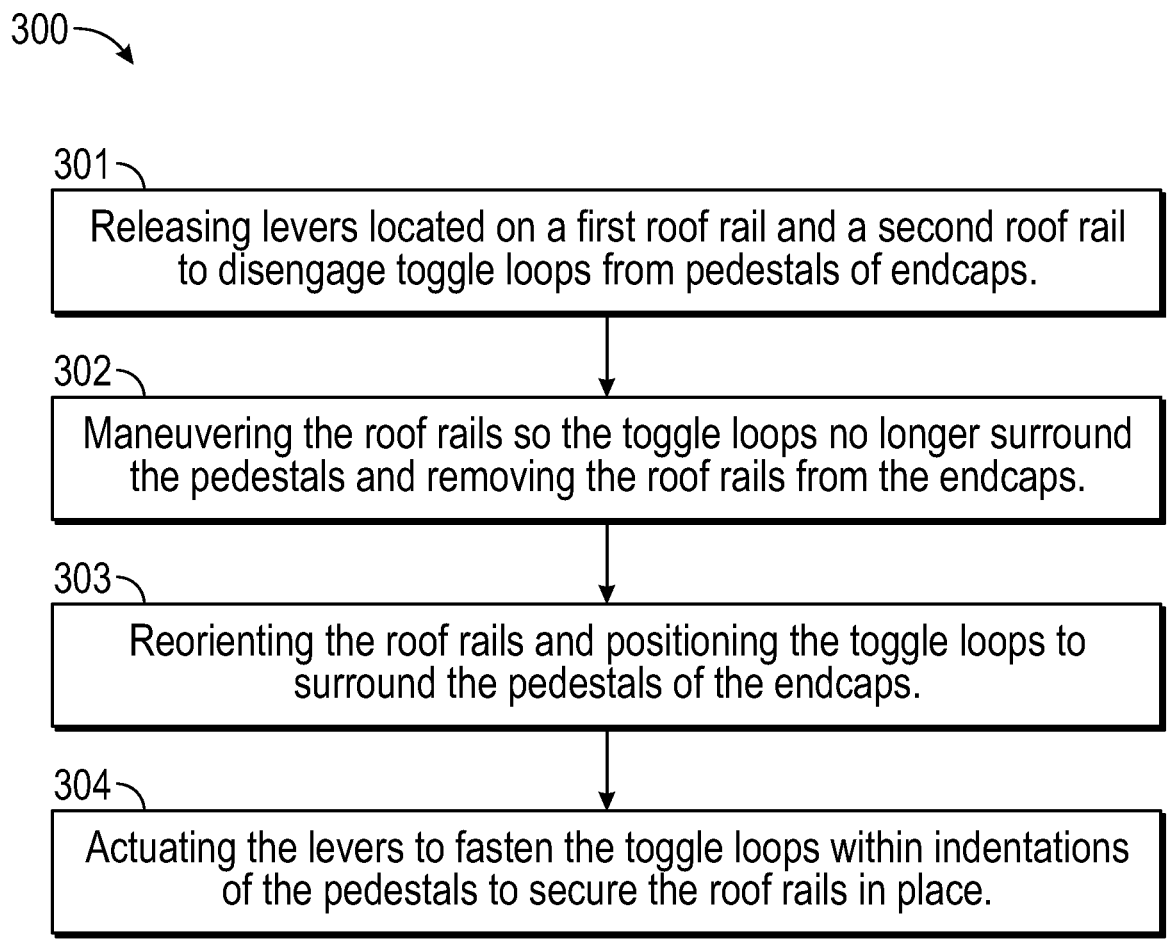
FIG. 11 illustrates a method of reorienting the roof rack assembly from the longitudinal configuration to the cross-car configuration.

FIG. 11, with continued reference to FIGS. 1-10, illustrates a method 200 for reorienting the roof rack assembly 12 from the longitudinal configuration to the cross-car configuration. At step 301, a user may release the levers 34 of the quick release mechanisms 28 located on both ends of the first roof rail 20a to disengage toggle loops 32 from the pedestals 30 of endcaps 18a and 18c, and similarly may release the levers 34 of the quick release mechanisms 28 located on both ends of the second roof rail 20b to disengage toggle loops 32 from the pedestals 30 of endcaps 18b and 18d. At step 302, the user may maneuver the roof rails 20a/20b such that the toggle loops 32 no longer surround the pedestals 30 and the roof rails 20a/20b are fully removed from the end caps 18a/18b/18c/18d. At step 303, the user may reorient the roof rails 20a/20b and position the first roof rail 20a such that its toggle loops 32 surround the pedestals 30 of endcaps 18a and 18b, and position the second roof rail 20b such that its toggle loops 32 surround the pedestals 30 of endcaps 18c and 18d. At step 304, the user may actuate the levers 34 of the quick release mechanisms 28 of both the first and second roof rail 20a/20b such that flat front portions 32a of the toggle loops 32 are forced against and fastened within indentations 36 of the pedestals 30 that the toggle loops 32 surround to secure the roof rails 20a/20b in place. The roof rack 12 may be reoriented from the cross-car configuration to the longitudinal configuration using similar steps.

The disclosed roof rack assembly 12 allows a user to utilize roof rails in a longitudinal and a cross-car configuration without requiring the purchase of additional components. The roof rack assembly 12 decreases part complexity from a traditional cross-car set up, which has typically included cross-car rails mounted to longitudinal rails, to a single mechanism that covers both longitudinal and cross-car use cases. Accordingly, the roof rack assembly 12 provides a simple and cost-effective solution that improves a user's experience with vehicle 10.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments. In other words, the placement and orientation of the various components of the roof rack assembly 12 are shown schematically and could vary within the scope of this disclosure. In addition, the various figures accompanying this disclosure are not necessarily drawn to scale, and some features may be exaggerated or minimized to emphasize certain details of a particular component.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A roof rack assembly for a vehicle, comprising:
   a pedestal including an indentation; and
   a roof rail movable between a first configuration and a second configuration relative to the pedestal,
   wherein, in the first configuration, a toggle loop of the roof rail directly engages with the indentation in a first orientation, and
   wherein, in the second configuration, the toggle loop directly engages with the indentation in a second orientation.

2. A roof rack assembly for a vehicle, comprising:
   a pedestal including an indentation; and
   a roof rail movable between a first configuration and a second configuration relative to the pedestal,
   wherein, in the first configuration, a toggle loop of the roof rail is positioned in a first orientation relative to the indentation,
   wherein, in the second configuration, the toggle loop is positioned in a second orientation relative to the indentation, and
   wherein the toggle loop includes a flat front loop portion, and further wherein the pedestal includes a first face configured to receive the flat front loop portion in the first configuration and a second face that is substantially orthogonal to the first face and configured to receive the flat front loop portion in the second configuration.

3. The roof rack assembly of claim 2, wherein the indentation spans from the first face to the second face and is configured to receive the flat front loop portion.

4. The roof rack assembly of claim 1, wherein the roof rail includes a lever actuatable to fasten the toggle loop to the pedestal.

5. The roof rack assembly of claim 4, wherein the toggle loop includes loop ends engaging the lever and a front loop portion configured to be received in the indentation in both the first and second configuration.

6. The roof rack assembly of claim 5, wherein actuation of the lever translates the loop ends away from the pedestal such that the front loop portion is fastened within the indentation.

7. The roof rack assembly of claim 1, wherein the roof rail includes a base and at least one rotatable member mounted on the base, the rotatable member rotatable from a stowed position in which it is substantially parallel to the base to a vertically extending position.

8. The roof rack assembly of claim 7, wherein the at least one rotatable member includes a first rotatable member and a second rotatable member each rotatable about respective pivot points located towards opposed longitudinal ends of the base.

9. The roof rack assembly of claim 8, wherein the pivot points include a stop at the vertically extending position, and the rotatable members each form an obtuse angle with the base at said vertically extending position.

10. The roof rack assembly of claim 8, wherein the roof rail includes a divider mounted to the base between the first and second rotatable members, and wherein the members and divider form a substantially continuous top surface of the roof rail when the members are in the stowed position.

11. The roof rack assembly of claim 10, wherein the divider and the rotatable members are removable from the roof rail.

12. The roof rack assembly of claim 1, wherein the roof rail includes a retractable tie-down cordage mechanism.

13. A vehicle including the roof rack assembly of claim 1.

14. A roof rack assembly for a vehicle, comprising:
at least one endcap including a pedestal; and
at least one roof rail movable between a longitudinal configuration and a cross-car configuration, the at least one roof rail including a lever and a toggle loop;
wherein the toggle loop includes loop ends engaging the lever and a front loop portion configured to engage the pedestal in both the longitudinal and the cross-car configuration, and
wherein actuation of the lever translates the loop ends away from the pedestal such that the front loop portion is fastened to the pedestal.

15. The roof rack assembly of claim 14, wherein the at least one roof rail is removable from the at least one endcap.

16. The roof rack assembly of claim 14, wherein the at least one roof rail is extendable between a first length in the cross-car configuration and a second, different length in the longitudinal configuration.

17. The roof rack assembly of claim 14, wherein the at least one roof rail includes a first roof rail and a second roof rail, and the first and second roof rails each include two levers and two toggle loops.

18. The roof rack assembly of claim 17, wherein the at least one endcap includes a first endcap and a second endcap located towards a front of the vehicle and a third endcap and a fourth endcap located towards a rear of the vehicle, the first and third endcaps located towards a first lateral side of the vehicle and the second and fourth endcaps located towards a second, opposed lateral side of the vehicle.

19. The roof rack assembly of claim 18, wherein, in the longitudinal configuration, the toggle loops of the first roof rail engage with the pedestals of the first and third endcaps, and the toggle loops of the second roof rail engage with the pedestals of the second and fourth endcaps.

20. The roof rack assembly of claim 19, wherein, in the cross-car configuration, the toggle loops of the first roof rail engage with the pedestals of the first and second endcaps, and the toggle loops of the second roof rail engage with the pedestals of the third and fourth endcaps.

* * * * *